United States Patent [19]

Sibley

[11] 4,229,663
[45] Oct. 21, 1980

[54] APPARATUS FOR SENSING VEHICULAR MECHANICAL MOTION

[75] Inventor: Henry C. Sibley, Adams Basin, N.Y.

[73] Assignee: General Signal Corporation, Rochester, N.Y.

[21] Appl. No.: 2,766

[22] Filed: Jan. 11, 1979

[51] Int. Cl.$^2$ ............................................. B60N 5/00
[52] U.S. Cl. ...................................... 307/9; 180/281; 246/167 R; 340/669
[58] Field of Search ............................ 307/9, 10, 119; 340/52 R, 62, 669, 670, 671; 246/63 R, 63 A, 63 C, 167 R, 182 R, 182 B, 187 R, 187 B; 180/281, 282, 286; 73/509

[56] References Cited

U.S. PATENT DOCUMENTS

| | | | |
|---|---|---|---|
| 3,575,604 | 4/1971 | Smith | 307/9 |
| 3,760,189 | 9/1973 | Jones, Jr. | 340/671 X |

Primary Examiner—L. T. Hix
Assistant Examiner—James L. Dwyer
Attorney, Agent, or Firm—Oblon, Fisher, Spivak, McClelland & Maier

[57] ABSTRACT

An apparatus for sensing vehicular mechanical motion, which includes a motion transducer for sensing a vehicular displacement, and which generates plural groups of transducer signals based on the sensed displacements, with the transducer signals of each group bearing a predetermined relative phase relationship with respect to the transducer signals of the other groups. The plural groups of transducer signals are respectively applied to plural latching switch circuits, each of which is capable of being set to a first motion sensitive output state and latched to a second output state upon the application thereto of a signal from a respective group of signals. Connected to the plural latching switch circuits is a circuit for detecting when all the latching switch circuits are in the second latched output state and for then generating a motion detected signal indicative of the fact that a predetermined vehicular displacement has occured. Also provided is a circuit for setting each of the latching switch circuits to the first non-latched output state upon the initiation of operations which for safety reasons require the sensing of vehicular motion.

5 Claims, 3 Drawing Figures

APPARATUS FOR SENSING VEHICULAR MECHANICAL MOTION

BACKGROUND OF THE INVENTION

1. Field of the Invention:

This invention relates to an apparatus for sensing vehicular mechanical motion, which finds particular, but not exclusive, utility in the environment of rail mass transit systems.

2. Description of the Prior Art:

An unauthorized or unexpected motion in modern rail transit systems may cause an unsafe condition in which the physical well being of passengers using the rail system is placed in peril. For example, a potentially fatal unsafe condition occurs upon the movement of a rail vehicle, due to the accidental release or failure of the vehicle brakes, while passenger doors of the rail vehicle are for some reason open. In that event, it is imperative to quickly detect the existence of such an unsafe condition, and to take immediate effective action to rectify the situation. Thus, most modern rail-transit systems incorporate tachometric sensors to detect vehicle motion and to produce a signal indicative thereof, by which predetermined measures can be taken to protect against an unsafe condition. However, tachometric sensors tend to be relatively expensive, and their use can therefore be financially prohibitive, especially where large numbers of sensors are required.

Most modern rail transit systems employ cycle checking safety design techniques to protect against unsafe conditions. Cycle checking involves the continuous testing of a device, circuit, or computer instruction to insure that it is completely functional. Furthermore, safety design techniques are generally directed to the promotion of fail-safe, or "vital", operation, in which any failures which occur tend to result in a condition which is no more dangerous (or conversely at least as safe) as if an equipment failure had not occured.

SUMMARY OF THE INVENTION

Accordingly, one object of this invention is to provide a novel apparatus for sensing vehicular mechanical motion in order to enhance the operational safety of rail transit systems.

A further object of this invention is to provide a novel apparatus for sensing vehicular mechanical motion, suitable for use in a fail-safe system in which cycle checking is a keynote feature.

Yet another object of this invention is to provide a novel apparatus for sensing vehicular mechanical motion which in fact is sensitive to a predetermined amount of movement, and not the speed, of an associated vehicle.

A further object of this invention is to provide a novel apparatus for sensing vehicular mechanical motion, exhibiting a sensitivity selectable in accordance with the needs of a particular application.

These and other objects are achieved by providing a novel apparatus for sensing vehicular mechanical motion which includes a motion transducer for sensing a vehicular displacement, and which generates plural groups of transducer signals based on the sensed displacements, with the transducer signals of each group bearing a predetermined relative phase relationship with respect to the transducer signals of the other groups. The plural groups of transducer signals are respectively applied to plural latching switch circuits, each of which is capable of being set to a first motion sensitive output state and latched to a second output state upon the application thereto of a signal from a respective group of signals. Connected to the plural latching switch circuits is a circuit for detecting when all the latching switch circuits are in the second latched output state and for then generating a motion detected signal indicative of the fact that a predetermined vehicular displacement has occured. Also provided is a circuit for setting each of the latching switch circuits to the first non-latched output state upon the initiation of operations which for safety reasons require the sensing of vehicular motion.

BRIEF DESCRIPTION OF THE DRAWINGS

A more complete appreciation of the invention and many of the attendant advantages thereof will be readily obtained as the same becomes better understood by reference to the followings detailed description when considered in connection with the accompanying drawings, wherein.

DETAILED DESCRIPTION OF THE PREFERRED EMBODIMENTS

Figures 1, 2:
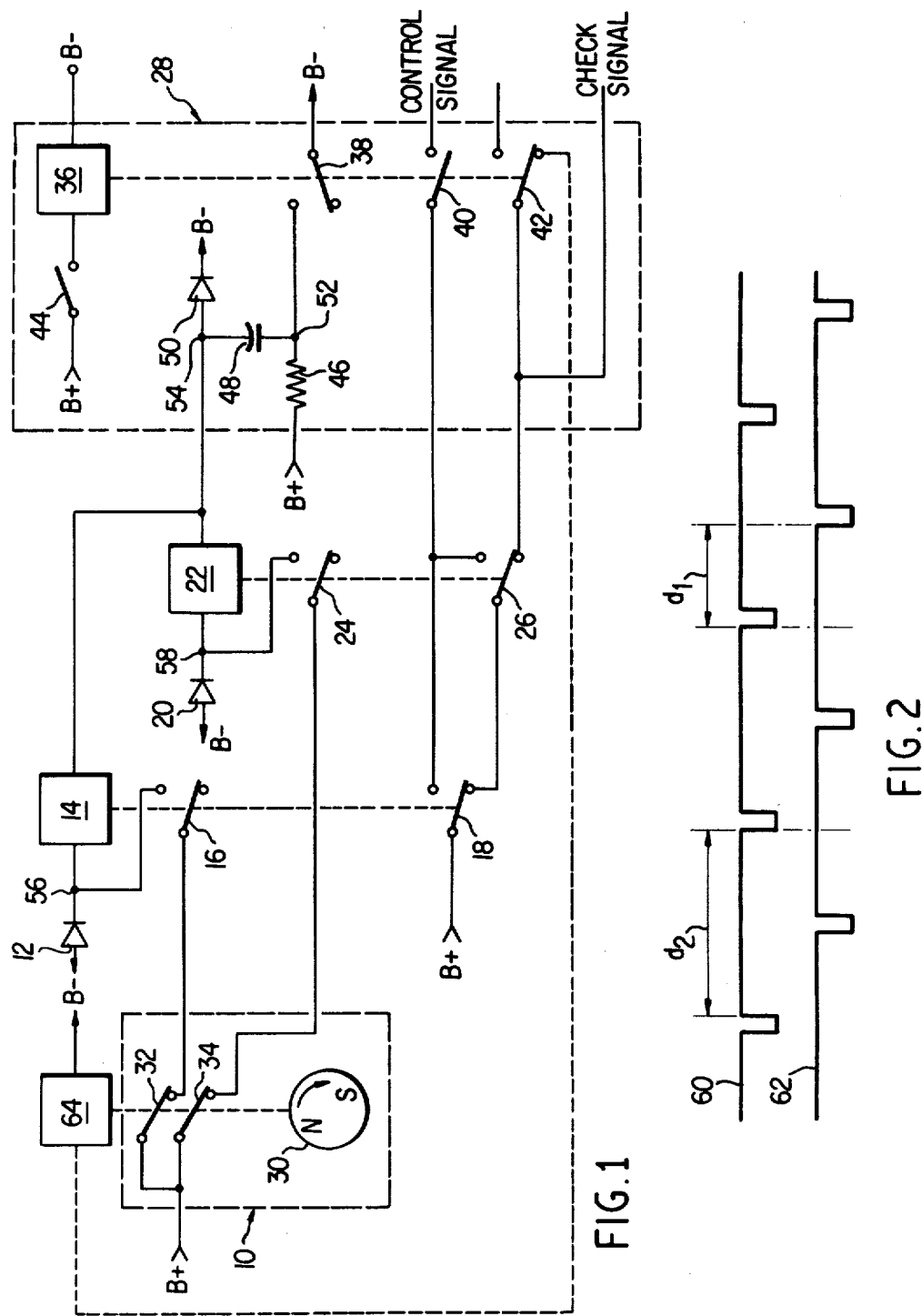
FIG. 1 is a schematic circuit diagram of one embodiment of the apparatus for sensing mechanical motion of the invention.
FIG. 2 is a diagram of selected waveforms produced by the motion sensor of the apparatus of the invention.

Referring now to the drawings, wherein like reference numerals designate identical or corresponding parts throughout the several views, and more particularly to FIG. 1 thereof, the apparatus for sensing vehicular mechanical motion according to the invention is seen to include a motion sensor 10, a diode 12, a relay coil 14, having upper and lower contacts 16 and 18 respectively, a diode 20, a relay coil 22, having upper and lower contacts 24 and 26 respectively, and a circuit 28 for initiating a motion sensitive operation.

As schematically shown in FIG. 1, the motion sensor 10 includes a magnetic actuator 30 having associated therewith a pair of normally closed contacts 32 and 34. The actuator 30 is provided with the same number of contacts as there are relay coils 14 and 22 in the circuit. The actuator 30 is magnetically coupled to a rotating member of the vehicle drive assembly (not shown). The rotating member in turn carries plural magnetic poles which interact with the normally closed contacts 32 and 34 such that each of these contacts is alternately opened at a low duty cycle. The actuator 30 is specifically designed to assure that the contacts 32 and 34 thereof cannot remain in the open position regardless of the postion of the actuating magnetic poles located on the rotating member. Thus, one or the other of the contacts 32 and 34 is always closed, and remain closed except during short actuation intervals produced by the magnetic poles of the rotating member.

Again referring to FIG. 1, it is seen that the initiate circuit 28 includes a reed relay 36 having associated contacts 38, 40, and 42, and energizable by means of switch 44. The initiate circuit 28 further includes the series combination of a resistor 46, a capacitor 48, and a diode 50, which is used to provide a momentary actuation of the relay coils 14 and 22. One side of the resistor 46 is connected to B+, the positive terminal of a DC voltage source. The other side of the resistor 46 is connected to the capacitor 48 at a junction 52, which in turn is connected to one pole of the upper contact 38 of the relay 36. The other side of the capacitor 48 is connected to the anode of the diode 50 at the junction 54, which in turn is connected to one side of both the relay coils 14 and 22. The cathode of the diode 50 is connected to the negative terminal B− of the voltage source.

The anodes of diodes 12 and 20 are both connected to B−, while the cathodes thereof are respectively connected at the junctions 56 and 58 to the other sides of the relay coils 14 and 22 and a pole of the upper contacts associated therewith, respectively. Thus, it is seen that the diode 12, the relay coil 14, and the diode 50 form one series circuit, while the diode 20, relay coil 22, and diode 50, form a second series circuit.

During operation of the circuit shown in FIG. 1, and more particularly upon the initiation of a motion sensitive operation, such as the opening of passenger doors, the switch 44 is closed, thereby energizing the relay 36. Energization of the switch 36 results in each of the wipers of the contacts 38, 40, and 42 contacting the upper pole of the respective contact, opposite to that as shown in FIG. 1. Thus, since the wiper of the upper contact 38 is tied to B−, then the junction 52 is likewise tied to B− through the upper pole and the wiper of contact 38. However, since the capacitor 48 was initially charged through the resistor 46 to the voltage B+, and since the voltage across a capacitor is always continuous, the connection of the junction 52 to B− results in a relative lowering of the voltage potential at the junction 54. At this point the diode 50 is back-biased and non-conducting, while the diodes 12 and 20 become forward-biased and remain so during the discharge of the capacitor 48. Nevertheless, however, the diodes 12 and 20 remain forward biased for a sufficiently long time in which the relay coils 14 and 22 are energized.

Energization of the coils 14 and 22 produces a change in the position of the wipers of the contacts 16, 18 and 24, 26 respectively associated therewith, to the position opposite to that as shown in FIG. 1. At this time, and assuming that the contacts 32 and 34 are in the position shown in FIG. 1, the relay coil 14 is maintained in the energized state by the application of B+ through the contact 32, the contact 16, and diode 50. Similarly, relay coil 22 is likewise maintained energized through the contact 34, the contact 24, the coil 22, and the diode 50. Thus, in the absence of sensed motion, relay coils 14 and 22 are maintained energized through the respective energization circuits after the discharge of the capacitor 48.

During the time period that either of the relay coils 14 and 22 are maintained energized, a control signal at the level B+ is made available at the upper pole of contact 40 by means of either the lower contact 18 of the relay coil 14 or the lower contact 26 of the relay coil 22. Thereafter, if vehicular movement ensues, the normally closed wipers of contacts 32 and 34 are alternately opened at various time intervals to produce two groups of motion detected signals respectively applied to the wipers of contacts 16 and 24, as shown by the signals 60 and 62 illustrated in the upper and lower traces, respectively, shown in FIG. 2. Immediately upon the opening of a particular one of the contacts 32 or 34, there results a corresponding opening of the energization circuit of the associated relay coil, 14 or 22. When the energization circuit associated with either of relays 14 or 22 is open-circuited, the respective relay 14 or 22 is released and the respective contacts 16, 18 or 24, 26 are returned to the position shown in FIG. 1. At this time, the control signal evidenced at the upper pole of the contact 40 is terminated indicating that a vehicle displacement has occured, and that appropriate safety measures must therefore be taken. Thereafter, relay coils 14 and 22 can be reenergized, after a sufficient time has passed in which the capacitor 48 can be recharged through the resistor 46, to initiate another motion sensitive operation.

When the relay coils 14 and 22 are both de-energized, a check signal is fed over the respective lower contacts 18 and 26 in series. This check signal can be used to prove that the motion detector is operable by using the cycles checking techniques well known in the rail industry. For example, when a desired motion is started, the check signal must appear in a very short time. The lack of a check signal otherwise indicates that the circuit has failed, and that motion should therefore not be allowed.

As shown in FIG. 2, the outputs 60, 62 of the contacts 32, 34 are 180° out of phase. Thus, if motion has been halted such that either of the motion sensor contacts 32 or 34 is just ready to be opened, the apparatus of the invention is sensitive to a minimum displacement $d_1$ corresponding to the interval between alternate openings of the contacts 32 and 34. If, on the other hand, motion is halted immediately after the opening of one of the motion sensor contacts 32 and 34, the apparatus of the invention is sensitive to a displacement $d_2$ corresponding to just less than twice the interval between alternate openings of the contacts 32 and 34, where $d_2 \cong d_1$. The absolute displacement variation represented by the difference $(d_2 - d_1)$ is readily selected by means of the number of the poles on the magnetic actuator 30 and the drive ratio of the vehicle. However, for the apparatus shown in FIG. 1, the variation in motion sensitivity, defined as the ratio of the maximum displacement $d_2$ to the minimum displacement $d_1$ is 2:1, depending upon the stopping point of the magnetic actuator.

The ratio of motion sensitivity of the apparatus shown in FIG. 1 can be improved by providing additional relay coils, i.e. in addition to coils 14 and 22, each having associated therewith a motion sensor contact, i.e. in addition to contacts 32, 34 or equivalent thereof. In that case, the maximum vehicular displacement required to insure release of all the relay coils (14, 22, plus additional relay coils) is the motion between successive short duration openings of one motion sensor contact (32, 34, etc). The minimum displacement would be less than the maximum displacement by the motion between the operations of two motion sensor contacts (32, 34, etc.) in sequence. For example, using three relay coils and associated motion sensor contacts would improve the variation in motion sensitivity to 3:2. Similarly, the use of four relay coils and associated contacts would improve the sensitivity variation 4:3.

The above discussion with respect to the improvement in variation in sensitivity naturally assumes the fact that the magnetic poles of the magnetic actuator 30 are arranged such that the vehicular displacement represented by the interval between the opening of the contact 32 and the opening of the contact 34 is equal to the vehicular displacement represented by the interval from the time of opening of the contact 34 to the opening of the contact 32. Stated somewhat differently, the groups of signals 60 and 62 respectively applied to the wipers of contacts 16 and 24 bear a continuous predetermined phase relationship, i.e. the signals are 180° out of phase. Naturally, if three or four sets of motion sensor contacts and associated relay coils are employed, the corresponding phase relationship between the groups of signals applied to the relay coil contacts from the motion sensor actuator contacts would be 120° and 90°, respectively.

As an optional feature, the apparatus of the invention shown in FIG. 1 can additionally be provided with another relay coil 64, to be associated with the motion sensor 10, and coupled to the contacts 32 and 34 of the magnetic actuator 30. The coil 64 is intended to override the operation of the actuator 30 during vehicular operations not requiring motion sensing. Thus, when the coil 64 is energized, the contacts 32, 34 are held motionless so that normal running of the vehicle does not continuously operate the contacts. Accordingly, the contact life of these contacts is considerably lengthened by the provision of relay coil 64.

Figure 3:
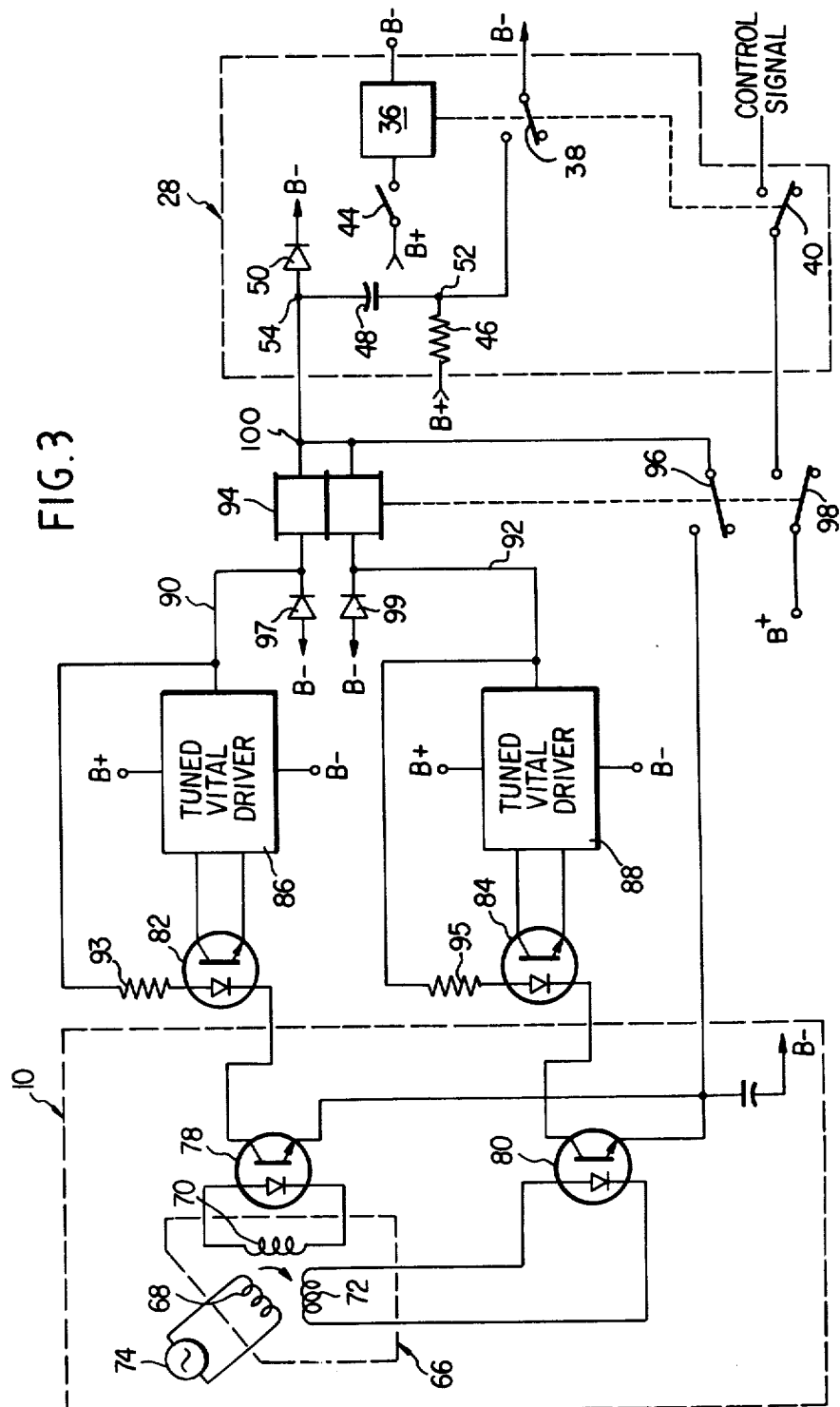
FIG. 3 is a schematic circuit diagram of a second embodiment of the apparatus for sensing vehicular mechanical motion, according to the invention.

A second preferred embodiment of the apparatus of the invention is shown in FIG. 3, wherein the motion sensor 10 is implemented by means of a transformer 66 having a rotating primary coil 68 and a pair of secondary windings 70 and 72 in quadrature to each other. Connected to the primary 68 is a signal generator 74 producing a sinusoidal analog signal. The secondary windings 70 and 72 are respectively connected to associated isolator circuits 78 and 80, each of which includes a light emitting diode optically coupled to a light-sensitive transistor. The collectors of the transistors of isolator circuits 78 and 80 are respectively connected to additional isolator circuits 82 and 84 which each likewise include a light emitting diode optically coupled to a light sensitive transistor. The emitter and collector terminals of the transistors of isolator circuits 82 and 84 are then connected to respective tuned vital driver circuits 86 and 88.

The tuned vital drivers 86 and 88 produce outputs 90 and 92 which are respectively fed back through resistors 93 and 95 to the light emitting diode of the respective isolating circuits 82 and 84. Each of the outputs 90 and 92 are additionally connected to a respective coil of a vital relay 94 and the cathode of a respective diode 97 or 99, the anodes of these diodes connected to B—. Associated with the vital relay 94 are upper and lower contacts, 96 and 98, respectively.

The vital relay 94 is designed such that in the absence of energization current through the coils thereof, the contacts 96 and 98 are open. Relay 94 has an output for each of the coils thereof, and these outputs are tied together to produce a single vital relay output 100. The output 100 is applied to an initiate circuit 28, essentially identical to that of the apparatus shown in FIG. 1, and the wiper of the upper contact 96 associated with the vital relay 94. Since the outputs of the vital relay 94 are tied to a common output 100, the vital relay 94 provides an "OR" function with respect to the inputs 90 and 92 applied to the coils thereof.

The tuned vital drivers 86, 88 shown in FIG. 3 essentially serve to filter, rectify, and threshold detect the level of an AC signal applied to the input terminals thereof from the associated isolator circuits, 82 or 84. The tuned vital drivers 86 and 88 are therefore active devices, and upon the application of an AC signal of sufficient amplitude to the inputs thereof, a DC signal at the level of B+ is generated at the respective driver output, 90 or 92.

During operation of the circuit of FIG. 3, the AC signal produce by single generator 74 is continously applied to the primary coil 68 of transformer 66. Thus, the AC signal is coupled to each of the secondary coils 70 and 72 in relation to the flux coupling between the transformer primary coil 68 and the particular secondary coil 70 or 72.

Prior to the initiation of a motion sensitive operation, the outputs 90 and 92 of the vital drivers 86 and 88 are latched to a voltage level, e.g. B—, sufficiently low to disenable conduction of the transistors 78 and 80. However, upon the initiation of a vehicular motion sensitive operation, such as by the energization of relay coil 36 of the initiate circuit 28, the output 100 of the vital relay 94 is temporarily maintained at a relatively low voltage potential, i.e. minus B as a result of the voltage appearing across the charged capacitor 48. Then, each of the coils of the vital relay 94 experiences a current from the respective diode 97, 99 to the lower potential discussed above. Thus, the vital relay coil is energized, and the wipers of the upper and lower contacts 96 and 98 are switched to the opposite pole other than as shown in FIG. 3.

The switching of the wiper contact 96 as described above results in the completion of a pair of circuits from the outputs 90, 92 of the tuned vital drivers through the light emitting diodes of isolator circuits 82 and 84, through the transistors of isolator circuits 78 and 80, throught the contact 96, through the coils of the vital relay 94, and back to the output 90, 92 of the drivers 86, 88, respectively. Thereafter, AC signal is coupled from the primary 68 of the transformer 66 to the secondary coils, which produces a current conduction through the transistors of isolator circuit 78 and 80 as a result of illumination produced by the light emitting diodes of these isolator circuits. Current conduction through the transistors of isolator circuits 78 and 80 is sensed by the isolator circuits 82 and 84 and results in an AC signal being applied to each of the tuned vital drivers 86 and 88. The vital drivers 86, 88 which are tuned to the AC signal, detect the presence thereof, at which time the outputs 90 and 92 of the vital drivers 86 and 88 are switched to the B+ voltage level, whereby the energization of the coils of the vital relay 94 is sustained after discharge of the capacitor 48 of the initate circuit 28. At this point, any vehicular displacement produces a corresponding rotation of the primary coil 68, and a concomitant change in the coupling between the primary coil 68 and the secondary coils 70 and 72. Eventually, there is no coupling between the primary coil and a particular one of the secondary coils, such that the output from each of the secondary coil passes through zero at different times. Since the secondary coils 70 and 72 are arranged in quadrature, the outputs thereof are 180° out of phase.

The magnitude of the AC signal 74 applied to the transformer primary coil 68, and the turns ratio of the transformer 66, are selected so as to take advantage of the conduction threshold of the light emitting diodes of the isolator circuits 78 and 80. Thus, as vehicular motion eventually and alternately produces an absence of transformer secondary voltage applied to each of the isolator circuits 78 and 80, the respective transistors of these isolator circuits then become non-conducting, which results in zero signal being applied to the respective tuned vital driver at the time of non-conduction, whereupon the output of the tuned vital driver is switched to the B− voltage state. However, since the coupling between the isolator circuits 78 to 82 and 80 to 84 is not effective until the associated vital driver 86 or 88 is delivering energy to the respective isolator circuits, it is seen that once the tuned vital driver is switched to the B− state, it is latched at that state regardless of any further changes in the respective transformer secondary output voltage. Thus, it is seen that each of the tuned vital drivers shown in FIG. 3, and its associated isolator circuits, operates as a latching circuit. Once conduction is started, it will continue until vehicular motion drives the output of a transformer secondary coiled to a null condition, whereupon the respective tuned vital driver is latched to an effective "OFF" state.

As noted above, since each tuned vital driver 86, 88 energized one coil of the vital relay 94 sufficiently to pick the relay, the pair of relay provide an "OR" function by which the vital relay 94 is maintained switched as long as either of tuned vital drivers is at the B+ output state. However, once both of the drivers 86, 88 revert to the latched B− state, the coils of the vital relay 94 are de-energized, and the contacts 96 and 98 are returned to the state shown in FIG. 3.

The apparatus shown in FIG. 3, like that of FIG. 1, also generates a Control Signal during execution of a motion sensitive operation, through the application of B+ through the contact 98 associated with relay 94, and through the contact 40 associated with the initate 36, to an outside control line. In the embodiment shown in FIG. 3, it is not necessary to provide a separate Check Signal because the circuit and the output relay are inherently vital.

From the above discussion, it is seen that the apparatus of the invention, as a result of being sensitive to the motion, i.e. the actual displacement, of the rail vehicle, enhances the operational safety of rail transit systems. Additionally, this apparatus is completely compatable with the vital design requirements of modern rail transit systems. It is particularly noted that the embodiment shown in FIG. 3 can be implemented with the key components thereof formed of solid state devices, thereby further promoting the overall reliability of the rail transit system. Additionally, the variation in sensitivity of either of the embodiments disclosed, is highly selectable, with the variation in sensitivity of the embodiment shown in FIG. 3 controllable in an analogous fashion as was discussed above with respect to the embodiment shown in FIG. 1.

Obviously, numerous modifications and variations of the present invention are possible in light of the above teachings. For example, while the motion sensors 10 in the two examples described above are rotary devices coupled to a member whose motion is to be sensed, other types of sensors might also be used, such as a moving shutter or reflector capable of interupting an optical coupling. Additionally, the motion sensor 10 need not be wholly contained on the vehicle whose motion is being monitored. Instead, one element, for example, an array of optical stripes, magnets, coils or a transposed line can be placed on the wayside with a coacting component mounted on the vehicle. For door controls, for example, the wayside element may be placed on the edge of the station platform or near the ground at the position where the vehicle doors are open. It is therefore to be understood that within the scope of the appended claims, the invention may be practiced otherwise than as specifically described herein.

What is claimed is:

1. An apparatus for sensing vehicular mechanical motion, comprising:

motion transducer means for sensing vehicular displacement and for generating plural groups of transducer signals based on the sensed displacements, with the transducer signals of each group bearing a predetermined relative phase relationship with respect to the transducer signals of the other groups;

a plurality of latching switch circuits, each having applied thereto a particular one of said groups of signals produced by said transducer means, each latching switch circuit capable of being set to a first motion sensitive output state and subsequently latched to a second output state upon the application thereto of a signal from the respective group of signals;

first means for setting each of said latching switch circuits to said first output state upon initiation of a motion sensitive operation; and, second means connected to said latching switching circuits for detecting when each of said latching switching circuits is in said second output state, said second means then generating a motion detected signal.

2. An apparatus according to claim 1, wherein said motion transducer means generates said plural groups of signals with common phase intervals between the signals of respective of said groups.

3. An apparatus according to claim 1, wherein the vehicle whose mechanical motion is being sensed includes a drive assembly, and the motion transducer means comprises:

a magnetic actuator having a pair of normally closed contacts; and a rotating member coupled to the vehicle driver assembly and having plural magnetic poles which interact with the normally closed contacts of the magnetic actuator to alternately open said contacts in accordance with motion of said vehicle.

4. An apparatus according to claim 1, wherein the vehicle whose mechanical motion is being sensed includes a drive assembly, and the motion transducer means comprises:

a transformer having a rotatable primary coil coupled to said drive assembly and at least two secondary coils arranged in quadrature with respect to said primary coil; and, a source of AC signal applied to said primary coil.

5. An apparatus according to claim 4, wherein each of said latching switch circuits comprises:

a tuned latching driver coupled to said first setting means;

a first isolator circuit connected to a respective one of said secondary coils, said isolating circuit comprising a light emitting diode connected to the respective secondary coil and a light sensitive transistor optically coupled to said light emitting diode; and, a second isolator circuit comprising a light emitting diode connected in series with the transistor of said first light emitting circuit, and a light sensitive transistor optically coupled to the light emitting diode of the second isolator circuit and electrically coupled to said tuned latching driver;

wherein said first setting means produces an output voltage at the output of said driver which enables current conduction through the diode of the second isolator circuit and the transistor of the first isolator circuit as a result of coupling of the AC signal from the transformer primary coil to the respective transformer secondary coil, said driver detecting the presence of said AC signal and maintaining its output as long as AC signal of a predetermined amplitude is coupled to the input of said driver, and when the amplitude of the AC signal applied to said driver decreases below a predetermined value, the output of said driver is latched to said second output state.

* * * * *